US006811866B1

(12) United States Patent
Kinoshita et al.

(10) Patent No.: US 6,811,866 B1
(45) Date of Patent: Nov. 2, 2004

(54) HEAT-SENSITIVE STENCIL SHEET

(75) Inventors: Hideyuki Kinoshita, Inashiki-gun (JP); Hiroshi Watanabe, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/395,805

(22) Filed: Sep. 14, 1999

(30) Foreign Application Priority Data

Sep. 14, 1998 (JP) .......................................... 10/260076

(51) Int. Cl.[7] .................................................. B32B 9/00

(52) U.S. Cl. .................... 428/318.4; 428/195; 428/409; 428/913

(58) Field of Search ............................. 428/195, 318.4, 428/409, 913, 304.4

(56) References Cited

U.S. PATENT DOCUMENTS

| | | | | |
|---|---|---|---|---|
| 6,025,286 A | * | 2/2000 | Kawatsu et al. | 442/287 |
| 6,076,460 A | * | 6/2000 | Kagawa | 101/128.4 |
| 6,080,484 A | * | 6/2000 | Ujiie et al. | 428/401 |

FOREIGN PATENT DOCUMENTS

| | | |
|---|---|---|
| JP | 111953 | 1/1984 |
| JP | 59-2896 | 1/1984 |
| JP | 59-16793 | 1/1984 |
| JP | 2-67197 | 3/1990 |
| JP | 8-67080 | 3/1996 |

OTHER PUBLICATIONS

Patent Abstract of Japan, JP 09 067080 A, vol. 1996 No. 07, Jul. 31, 1996.

Patent Abstract of Japan, JP 59 016793 A, vol. 008, No. 104 (M–296), May 16, 1984.

Patent Abstract of Japan, JP 10 324074 A, vol. 1999 No. 03, Mar. 31, 1999.

Patent Abstracts of Japan, "Polyester Non–woven Fabric For Thermally Perforated Plate Printing", Takanori et al., Publ. No. 03–076894, Publ. Date: Apr. 2, 1991.

Patent Abstracts of Japan, "Thermosensitive Stencil Printing Sheet", Yukio et al., Publ. No. 08–067080, Publ. Date: Mar. 12, 1996.

Handbook of Textiles, 2nd Ed., pp. 240–241, edited by Society of Textile, published by Maruzen K.K., Mar. 25, 1994.

* cited by examiner

*Primary Examiner*—B. Shewareged

(74) *Attorney, Agent, or Firm*—Fitch, Even, Tabin & Flannery

(57) ABSTRACT

A heat-sensitive stencil sheet is provided, which is inhibited from jamming at the time of carrying or creasing at the time of winding around a drum, and thus excellent in carrying property and winding property. This heat-sensitive stencil sheet comprises a laminate of a thermoplastic resin film and a porous substrate mainly composed of synthetic fibers, and satisfies $0.150 \leqq T-H$ wherein T denotes an arithmetic average value (g·cm/cm) of absolute values of KES bending torque in lengthwise direction of the stencil sheet at curvatures of +2.3 and $-2.3\ cm^{-1}$, H denotes a bending hysteresis (g·cm/cm), and T–H denotes a residual torque (g·cm/cm).

10 Claims, 1 Drawing Sheet

HEAT-SENSITIVE STENCIL SHEET

Figure 1:
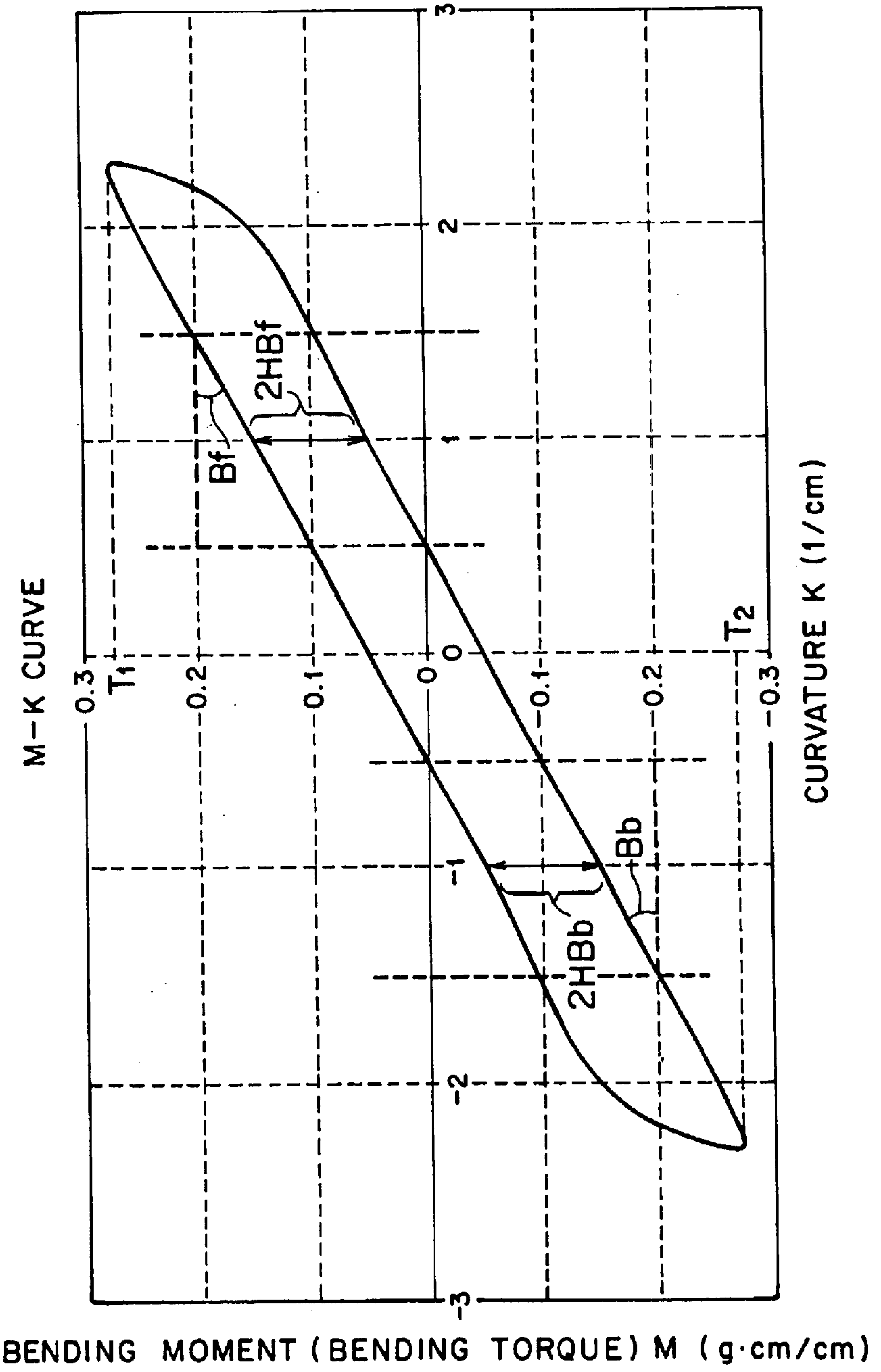

The present invention relates to a heat-sensitive stencil sheet, and more particularly to a heat-sensitive stencil sheet which causes no jamming in a stencil printing machine during feeding and no creasing at the time of winding around or loaded on a printing drum, and can provide sharp images.

Conventional heat-sensitive stencil sheets are not necessarily satisfactory in sharpness of printed images, especially, in uniformity of solid portions of the images. There are various causes therefor, and one of them is due to fibers constituting a porous substrate of the stencil sheet.

That is, thin papers comprising natural fibers, which have been most widely utilized as the substrate, have relatively thick and non-uniform fiber diameter and are flat. Therefore, ink is apt to unevenly pass therethrough, and especially passing of ink is often hindered by the fibers present just below the perforated parts of the stencil sheet to cause fading of the printed images. Furthermore, smoothness of the surface of a film laminated on the substrate is deteriorated by the thick fibers, and contact with thermal head at the time of perforation is poor to often cause deficient perforations. Thus, voids are formed in solid printing.

Some measures to solve these problems have been proposed. That is, it is proposed to use papers or nonwoven fabrics made from a mixture of synthetic fibers such as polyester fibers with natural fibers in place of the above-mentioned thin paper, thereby to make thinner the fibers of substrates or reduce the basis weight of the fibers as much as possible. See JP-A-59-2896, JP-A-59-16793, JP-A-2-67197, and the like.

However, although sharpness of images is improved by thinning the fiber diameter of the substrate or reducing the basis weight, the following new problems occur. That is, the stencil sheet is deteriorated in running property to cause jamming in the printing machine, or creases when the unperforated or perforated stencil sheet is wound around and loaded on a printing drum, resulting in deterioration of print quality.

In order to solve these problems, it is proposed to specify tensile strength and flexural rigidity of stencil sheets, namely, strength and nerve of stencil sheets. See JP-A-8-67080.

However, even if the conditions of the strength and the nerve of the stencil sheet are satisfied, the jamming of stencil sheets in the printing machine still occurs or creases are generated at the time of winding an unperforated or perforated stencil sheet around a printing drum depending on the state of dispersion or lamination of the fibers of the substrate, though the basis weight of the substrate is large.

The object of the present invention is to provide a heat-sensitive stencil sheet which is excellent in carrying properties and can be wound around a drum with forming no creases.

The inventors have made an intensive research on "running mechanism of stencil sheets", "creasing mechanism of stencil sheets during a drum winding operation", and "bending characteristics of stencil sheets" in a printing machine, and have found that a heat-sensitive stencil sheet satisfying a specific residual torque is excellent in carrying properties and winding properties. Thus, the present invention has been accomplished.

That is, the present invention relates to a heat-sensitive stencil sheet, which comprises a laminate of a thermoplastic resin film and a porous substrate mainly composed of synthetic fibers, said stencil sheet satisfying $0.150 \leqq T-H$ wherein T means an arithmetic average value (g·cm/cm) of absolute values of KES bending torque in lengthwise direction of the stencil sheet at curvatures of +2.3 and −2.3 ($cm^{-1}$), H means a bending hysteresis (g·cm/cm), and T−H means a residual torque (g·cm/cm).

Hereupon, the residual torque (T−H) is a numerical value relating to bending characteristics of the stencil sheet, and especially it specifies a numerical value relating to recovery from bending, and the lengthwise direction means the running direction of the stencil sheet fed to the printing machine. Furthermore, the KES is an abbreviation of KAWABATA'S EVALUATION SYSTEM FOR FABRICS, and is a method widely employed as a method for measurement of physical quantity of the texture of woven or knitted fabrics, which was devised by Prof. Sueo Kawabata of the Kyoto University in Japan.

The creasing mechanism of stencil sheets at the time of being wound around or loaded on a drum is considered as follows. That is, the stencil sheet is wound around the circumferential surface of the rotated printing drum to load it on the drum, while it is pressed by a press roller. In this case, bubbles are sometimes taken into the portion between the stencil sheet and the surface of the printing drum in the area between the back end portion of the stencil sheet and the press roller. In the region where bubbles are present, the stencil sheet is apart and raised from the surface of the printing drum.

When the printing drum is further rotated, the bubbles gather in the vicinity of the press roller to form large bubbles and the portion where the stencil sheet is apart and raised from the surface of the printing drum becomes larger. The raised stencil sheet is finally buckled and bent, and this bent portions form creases.

In the above-mentioned creasing mechanism, formation of creases of the stencil sheet has a close relation with the bending characteristics (buckling characteristics) of the stencil sheet. That is, the bending torque (bending stress) generated when the stencil sheet is raised increases with further raising of the stencil sheet, but bending hysteresis (loss of stress) at the time of recovery from bending also gradually increases.

When the raised stencil sheet is buckled as mentioned above, the bending hysteresis tends to become extremely great, and the bending torque tends to become extremely small. That is, whether the buckling readily occurs or not can be judged by the property values of the bending torque and the bending hysteresis. However, these property values are strongly affected by the shape and the basis weight of the substrate. For example, a stencil sheet having a large basis weight is great in bending hysteresis so that a large loss of bending torque is caused, but since the bending torque is inherently great, the bending torque is still large even if the loss is deducted.

That is, "residual torque" which is a value obtained by deducting "bending hysteresis" from "bending torque" of the stencil sheet can be employed as an indication of whether the creases readily occur or not.

According to the conventional techniques which employ only the KES bending rigidity value B (average bending rigidity) as the indication, even if the KES bending rigidity value B is in a specified range, there is a possibility of the residual torque being smaller than the above limitation owing to the loss of balance of the bending torque or the bending hysteresis depending on a state of dispersion or lamination of fibers of the substrate. In this case, there is a problem that the stencil sheet is buckled and jams because of weak recovery power from buckling to make the running impossible or creases are formed to deteriorate the quality of print.

On the other hand, since the residual torque employed as an indication in the present invention is a value including the influence of dispersion or lamination state of fibers of the substrate, buckling of the stencil sheet can be effectively inhibited, and failure in feeding of stencil sheets and generation of creases can be effectively inhibited.

Thus, according to the present invention, even if raising of a stencil sheet (bending of a stencil sheet) occurs due to the bubbles at the time of winding of the stencil sheet around the drum as mentioned above, when the residual torque (T–H) in the lengthwise direction which is the same as the feeding direction of the stencil sheet is 0.150 (g·cm/cm) or more, preferably 0.180 (g·cm/cm) or more, the stencil sheet has a power to recover even when it is nearly buckled, and thus no creases are formed.

Furthermore, as a result of investigation on running mechanism of the stencil sheet in the printing machine, the possibility of occurrence of the jamming of the stencil sheet that is being carried can be determined by using the value of the residual torque (T–H) as an indication as in the case of the creasing mechanism. That is, when the residual torque (T–H) is less than 0.150 (g·cm/cm), the stencil sheet is buckled in the running route to result in failure of feeding.

In the present invention, the KES bending rigidity value B of the heat-sensitive stencil sheet in lengthwise or crosswise direction is preferably 0.02 gf·cm$^2$/cm or more. If the KES bending rigidity value B is less than 0.02 gf·cm$^2$/cm, the sheet is insufficient in so-called nerve, and when the stencil sheet is wound around a printing drum, creases in the form of earthworm are formed. As a result, print image is distorted or ink becomes faded in the creasing portions to cause defects in print.

Furthermore, in the present invention, the tensile strength of the heat-sensitive stencil sheet in lengthwise direction is preferably 0.3 kgf/cm or more. A tension is applied to the stencil sheet in running direction in the printing machine. If the tensile strength of the stencil sheet in lengthwise direction is less than 0.3 kgf/cm, strength of the stencil sheet is insufficient and cannot run smoothly and in an extreme case the stencil sheet is broken.

The heat-sensitive stencil sheet of the present invention comprises a laminate of a thermoplastic resin film and a porous substrate mainly composed of synthetic fibers.

In the present invention, as the thermoplastic resin film, there may be used conventional ones, for example, those of polyester, polyamide, polypropylene, polyethylene, polyvinyl chloride, polyvinylidene chloride or copolymers thereof. Polyester films are especially preferred from the point of perforation sensitivity. The polyesters include, for example, polyethylene terephthalate, a copolymer of ethylene terephthalate and ethylene isophthalate, polyethylene-2,6-naphthalate, polyhexamethylene terephthalate, and a copolymer of hexamethylene terephthalate and 1,4-cyclohexanedimethylene terephthalate.

The thermoplastic resin film is prefer ably stretched, and can be prepared by a known T-die extrusion method, inflation method, or the like. For example, the polymer is extruded on a casting drum by the T-die extrusion method to prepare an unstretched film, then the film is subjected to lengthwise stretching by a group of heating rolls, and, if necessary, this film can be subjected to crosswise stretching by feeding it to a tenter or the like. An unstretched film of desired thickness can be prepared by adjusting the width of the slit of head, the discharging amount of the polymer and the rotation number of the casting drum, and, besides, the film can be stretched at the desired stretching ratio by adjusting the rotating speed of the heating rolls or changing the width of the tenter.

The thermoplastic resin film is preferably biaxially stretched, and thickness of the film is optionally determined depending on the necessary sensitivity, etc., but is usually 0.1–10 $\mu$m, preferably 0.1–5 $\mu$m, more preferably 0.1–3 $\mu$m. If the thickness of the film exceeds 10 $\mu$m, the perforation sensitivity is sometimes deteriorated, and if it is thinner than 0.1 $\mu$m, the film forming stability is sometimes deteriorated.

If necessary, the thermoplastic resin film may contain flame retardants, heat stabilizers, antioxidants, ultraviolet absorbers, antistatic agents, pigments, dyes, organic lubricants such as fatty acid esters and waxes, and anti-foaming agents such as polysiloxane.

The synthetic fibers constituting the porous substrate are known fibers such as those of polyester, polyamide, polyphenylene sulfide, polyacrylonitrile, polypropylene, polyethylene and copolymers thereof. These synthetic fibers may be used each alone or in combination of two or more, or may contain natural fibers or regenerated fibers.

Among the above synthetic fibers, polyester fibers are preferred from the point of heat stability upon perforation, and the synthetic fibers preferably comprise at least 60% of the polyester fibers. As the polyesters, mention may be made of, for example, polyethylene terephthalate, polyethylene naphthalate, polycyclohexadimethylene terephthalate, and a copolymer of ethylene terephthalate and ethylene isophthalate. If necessary, these synthetic fibers may contain flame retardants, heat stabilizers, antioxidants, ultraviolet absorbers, antistatic agents, pigments, dyes, organic lubricants such as fatty acid esters and waxes, and anti-foaming agents such as polysiloxane.

In the present invention, average fiber diameter of the porous substrate is preferably 2–15 $\mu$m. If the average fiber diameter is less than 2 $\mu$m, the stencil sheet is apt to crease to result in deficient perforations. If the average fiber diameter exceeds 15 $\mu$m, the ink passes unevenly.

Basis weight of the fibers of the porous substrate is usually 2–30 g/m$^2$, preferably 2–20 g/m$^2$, more preferably 5–15 g/m$^2$. If the basis weight exceeds 30 g/m$^2$, passing ability of ink is deteriorated to lower the image sharpness. If the basis weight is less than 2 g/m$^2$, sometimes the strength of the substrate is insufficient.

The porous substrate may be a paper made from short fibers, a nonwoven fabric, a woven fabric or a screen gauze, and a nonwven fabric is preferred.

The nonwoven fabric can be produced by known direct melt spinning methods such as flash spinning method, melt blow spinning method and spun bond method.

For example, according to the melt blow method, the nonwoven fabric is produced by discharging a molten polymer from a spinneret with blowing of a hot air to the polymer from the circumference of the spinneret to make the discharged polymer into fine fibers, and then blowing the fibers onto a net conveyor disposed at a suitable position to collect the fibers thereon and form a web. Since the web is sucked together with the hot air by a sucking device provided at the net conveyor, the fibers are collected before the individual fibers are completely solidified. That is, the fibers of the web are collected in a state of being fusion bonded to each other. Degree of the fusion bonding of the fibers can be adjusted by optionally setting the fiber collecting distance between the spinneret and the net conveyor. Furthermore, the basis weight of the web and the filament diameter can be optionally set by optionally adjusting the discharging amount of the polymer, the hot air temperature, the flow rate of the hot air, and the conveyor moving speed.

The fibers spun by the melt blow method are made finer by the pressure of the hot air and solidified in a state of un-orientation or low orientation. Thickness of the fibers is not uniform, and the web is formed in a state of proper dispersion of thick fibers and thin fibers. Moreover, since the polymer discharged from the spinneret is rapidly cooled from molten state to room or ambient temperature, it is solidified in low-crystallized state close to an amorphous state.

The stencil sheet of the present invention is produced by laminating the above thermoplastic resin film and the above porous substrate into an integral state. In this case, the melting point ($Tm_1$) of the film and the melting point ($Tm_2$) of the porous substrate such as a nonwoven fabric preferably satisfy the relation $Tm_1 \leqq Tm_2$.

The film and the substrate may be laminated using adhesives on condition that the perforation sensitivity of the film is not lowered, or may be heat bonded to each other without using adhesives. From the point of sharpness of print, it is preferred to directly adhere the thermoplastic resin film and the porous substrate by heat bonding without using adhesives.

The heat bonding is usually carried out by hot pressing in which the thermoplastic resin film and the porous substrate are directly laminated together with heating. The method of hot pressing is not limited, but use of heating rolls is especially preferred from the point of processability.

In the present invention, it is particularly preferred to co-stretch the unstretched thermoplastic resin film and the nonwoven fabric in the state of being heat bonded. The heat bonding is preferably carried out before lengthwise stretching step of the nonwoven fabric and the unstretched film obtained by extrusion casting. The heat bonding temperature is preferably 80–170° C., more preferably 100–150° C.

By co-stretching the film and the nonwoven fabric in the state of being heat bonded, they can be satisfactorily stretched in an integral state without causing peeling from each other. In this case, the nonwoven fabric is stretched in a state of the fibers being fusion bonded at interlocking points or contacting points, and hence a reticulation which is suitable as a substrate can be formed. Furthermore, by co-stretching the film and the nonwoven fabric in an integral state, they are directly bonded and integrated without using adhesives.

Method of the co-stretching is not limited, but biaxial stretching is preferred, and specifically there are sequential biaxial stretching and simultaneous biaxial stretching. In the case of the sequential biaxial stretching, it is common to first carry out stretching in lengthwise direction and then stretching in crosswise direction, but they can be carried out in reverse order. The stretching ratio is not limited and is optionally determined depending on the kind of the thermoplastic resin used and the perforation sensitivity required for the stencil sheet, but is suitably about 2–8 times in both the lengthwise and crosswise directions. Moreover, after the biaxial stretching, additional stretching may be carried out in lengthwise or crosswise direction or in lengthwise and crosswise directions simultaneously.

Furthermore, the stencil sheet after biaxially stretched is preferably subjected to a heat treatment. Heat treating temperature is not limited, and is optionally determined depending on the kind of the thermoplastic resins used, but preferably is 80–260° C., and heat treating time is suitably about 0.5–60 seconds.

Two or more nonwoven fabrics having the same or different fiber diameter and basis weight may be put together, followed by stretching them.

The nonwoven fabrics are preferably stretched and oriented, and birefringence ($\Delta n$) of each nonwoven fabric is preferably 0.1 or more, more preferably 0.12 or more, particularly preferably 0.14 or more. Further, crystallinity of the nonwoven fabrics is preferably 20% or higher, especially preferably 25% or higher. Moreover, surface of the fibers constituting the nonwoven fabrics may be subjected to chemical treatments such as acid and alkali treatments, corona treatment, low-temperature plasma treatment, etc. in order to impart affinity with ink.

It is preferred to provide a release layer on the surface of the film constituting the stencil sheet by coating a releasing agent for the inhibition of sticking at the time of perforation. The coating of the releasing agent may be carried out at any stage after heat bonding the unstretched film and the unstretched nonwoven fabric, before or after the biaxial stretching, during the biaxial stretching or a step after taking-up of the film. It is especially preferred to coat the releasing agent before stretching in order to develop the effects of the present invention more conspicuously. Coating method is not limited, and preferably it is coated using roll coater, gravure coater, reverse coater, bar coater, etc. The releasing agents include known agents such as silicone oil, silicone resin, fluorocarbon resin, and surface active agent. The releasing agents may contain various additives such as antistatic agents, heat resisting agents, antioxidants, organic particles, inorganic particles, and pigments as far as development of the effects of the present invention is not hindered. The releasing agents may further contain various additives such as dispersing aids, surface active agents, preservatives, and anti-foaming agents for the purpose of improving the dispersibility in water. Thickness of the release layer is preferably 0.005–0.4 $\mu$m, more preferably 0.01–0.4 $\mu$m. When the thickness of the release layer is 0.4 $\mu$m or less, running property at the time of perforation is good and the thermal head is hardly stained.

Peeling strength of the thermoplastic resin film and the porous substrate constituting the stencil sheet of the present invention is preferably 1 g/25 mm or higher, more preferably 3 g/25 mm or higher, further preferably 5 g/25 mm or higher. If the peeling strength is lower than 1 g/25 mm, the thermoplastic resin film and the porous substrate are sometimes separated at the time of feeding and carrying the stencil sheet in the printing machine.

EXAMPLES

The present invention will be explained in more detail by the following examples. However, it should be understood that the present invention is not limited to the examples. Evaluation of the various properties in the examples was conducted by the following methods.

FIG. 1 shows a M–K curve used for measurement of KES bending rigidity referred to below.

(1) KES Bending Rigidity (Bending Torque, Bending Hysteresis, Residual Torque, Bending Rigidity Value B):

These were measured using a pure bending characteristic tester (JTC-1 manufactured by Nihon Seiki Seisakusho Co., Ltd.).

(1-1) Bending Torque (T), Bending Hysteresis (H), Residual Torque (T–H):

First, a stencil sheet was cut by a single-edged blade to prepare ten samples of 10 cm in width and 10 cm in length. Then, the sample was held by a fixed clamp and a movable clamp having a length of 20 cm the interval of which was set at 0.4 cm, and subjected to pure bending in a range of curvature=−2.3 to +2.3 ($cm^{-1}$) at a constant curvature changing rate of 0.3 ($cm^{-1}$/sec).

The relation between bending moment (bending torque) M (g·cm/cm) per unit length of the sample and curvature K ($cm^{-1}$) was plotted to obtain M–K curve as shown in FIG. 1.

Based on the M–K curve, absolute values ($T_1$, $T_2$) of bending moment at curvatures of −2.3 ($cm^{-1}$) and +2.3 ($cm^{-1}$) were obtained. An arithmetic average value of them was obtained for each of the ten samples, and an average value on the ten samples was employed as a bending torque T (g·cm/cm). Furthermore, bending hysteresis H calculated by the following formula (I) was obtained for each of the ten samples, and an average value thereof was taken as bending hysteresis H.

$$H=(2HBf+2HBb)/2\ (g\cdot cm/cm) \quad \text{(I)}$$

wherein 2HBf denotes a bending hysteresis at a curvature of 1 $cm^{-1}$, and 2HBb denotes a bending hysteresis at a curvature of −1 $cm^{-1}$.

Furthermore, a residual torque was calculated by the following formula (II).

$$\text{Residual torque}=T-H\ (g\cdot cm/cm) \quad \text{(II)}$$

(1-2) Bending Rigidity Value B:

First, a stencil sheet was cut by a single-edged blade to prepare ten samples of 10 cm in width and 10 cm in length. Then, the sample was held by a fixed clamp and a movable clamp having a length of 20 cm the interval of which was set at 1 cm, and subjected to pure bending in a range of curvature=−2.5 to +2.5 ($cm^{-1}$) at a constant curvature changing rate of 0.1 ($cm^{-1}$/sec).

The relation between bending moment (bending torque) M (g·cm/cm) per unit length of the sample and curvature K ($cm^{-1}$) was plotted to obtain the same M–K curve as of FIG. 1.

Gradient (Bf) between the curvatures of 0.5 and 1.5, and absolute value (Bb) of the gradient between the curvatures of −0.5 and −1.5 were measured. Bending rigidity value B (gf·$cm^2$/cm) per unit length was calculated by the following formula (III). An average value of bending rigidity values B of ten samples was obtained, and this was taken as a bending rigidity value B (gf·$cm^2$/cm).

$$B=(Bf+Bb)/2\ (gf\cdot cm^2/cm) \quad \text{(III)}$$

(2) Tensile Strength in Lengthwise Direction (Kgf/Cm):

A stencil sheet was cut in lengthwise direction by a single-edged blade to prepare ten samples of 15 mm in width and 150 mm in length.

The sample of 100 mm in testing length was pulled by a universal testing machine AUTOGRAPH AGS-D manufactured by Shimadzu Seisakusho, Ltd. at a testing speed of 10 mm/min until the sample was broken, and the load applied when the sample was elongated by 2% (2 mm) was divided by the width of the sample to obtain the strength. An average tensile strength on ten samples was obtained, and this was taken as the tensile strength in lengthwise direction.

(3) Average Fiber Diameter (μM)

Optional 10 portions of a sample of a nonwoven fabric sheet or a heat-sensitive stencil sheet were photographed by an electron microscope (SEM). Diameter of optional 15 fibers for each photograph was measured, and the measurement was conducted on 10 photographs. Thus, diameter of 150 fibers in total was measured, and an average fiber diameter was obtained.

(4) Fiber Basis Weight (g/$m^2$)

Weight of a stencil sheet was measured by a precision balance, and this was converted to a weight per $m^2$. Weight of the film was deducted therefrom to obtain a fiber basis weight.

(5) Evaluation of Jamming of the Sheet Under Feeding and Creasing Upon Winding the Sheet Around a Drum:

A stencil sheet was fed to "RISOGRAPH" (trade mark) GR377 manufactured by Riso Kagaku Corporation to conduct blank perforation (printing ratio: 0%) and halftone perforation (printing ratio: 10%), and then the stencil sheet was carried and wound around a printing drum.

Example 1

Polyethylene terephthalate ([η]=0.60, Tm=254° C.) was spun by melt blow method using a rectangular spinneret having 80 holes of 0.35 mm in diameter at a spinneret temperature of 285° C. The fibers were dispersed and collected on a conveyor to prepare a nonwoven fabric of 140 g/$m^2$ in basis weight and 20 μm in average fiber diameter.

Then, a copolymer polyester resin comprising 85 mol % of polyethylene terephthalate and 15 mol % of polyethylene isophthalate ([η]=0.65, Tm=210° C.) was extruded using an extruding machine of 40 mm in screw diameter at a T-die head temperature of 270° C. and cast on a cooling drum of 300 mm in diameter to prepare an unstretched film.

The above nonwoven fabric was put on the unstretched film, followed by feeding them to heating rolls to hot press them at a roll temperature of 80° C. to make a laminated sheet.

The laminated sheet was stretched 3.5 times in lengthwise direction between heating rolls of 90° C., then fed into a tenter stretching machine to stretch 4 times in crosswise direction at 95° C., and furthermore heat treated at 160° C. in the tenter.

A wax releasing agent was coated on the surface of the film at a dry coating weight of 0.1 g/$m^2$ at an inlet of the tenter using a gravure coater to make a heat-sensitive stencil sheet.

The fiber basis weight of the resulting stencil sheet was 12.8 g/$m^2$, the average fiber diameter of the substrate was 8.7 μm, and the thickness of the film was 1.5 μm.

The stencil sheet had a tensile strength in lengthwise direction of 0.39 kgf/cm, a KES bending rigidity value B of length/width=0.068/0.055 g·$cm^2$/cm, and a residual torque of 0.2576 g·cm/cm.

This stencil sheet was fed to "RISOGRAPH" GR377 manufactured by Riso Kagaku Corporation, where the stencil sheet was subjected to blank perforation (printing ratio: 0%) and halftone perforation (printing ratio: 10%), carried, and wound around a printing drum. Occurrence of jamming of the stencil sheet during carrying and occurrence of creasing on the printing drum were examined.

As a result, carrying properties and winding properties were good as shown in Table 1.

Example 2

A heat-sensitive stencil sheet was made in the same manner as in Example 1, except that a nonwoven fabric of 130 g/$m^2$ in basis weight and 14 μm in average fiber diameter was used as the nonwoven fabric laminated with the unstretched film.

The resulting stencil sheet had a basis weight of 12 g/$m^2$, and the average fiber diameter of the substrate was 7.0 μm, and the thickness of the film was 1.5 μm.

The stencil sheet had a tensile strength in lengthwise direction of 0.38 kgf/cm, a KES bending rigidity value B of length/width=0.059/0.049 gf·$cm^2$/cm, and a residual torque of 0.2512 g·cm/cm.

The stencil sheet was evaluated in the same manner as in Example 1 to find that the carrying properties and the winding properties were good as shown in Table 1.

Example 3

A heat-sensitive stencil sheet was made in the same manner as in Example 1, except that a nonwoven fabric of 110 g/m$^2$ in basis weight and 14 $\mu$m in average fiber diameter was used as the nonwoven fabric laminated with the unstretched film.

The resulting stencil sheet had a basis weight of 10 g/m$^2$, and the average fiber diameter of the substrate was 7.0 $\mu$m, and the thickness of the film was 1.5 $\mu$m.

The stencil sheet had a tensile strength in lengthwise direction of 0.31 kgf/cm, a KES bending rigidity value B of length/width=0.041/0.035 gf·cm$^2$/cm, and a residual torque of 0.1875 g·cm/cm.

The stencil sheet was evaluated in the same manner as in Example 1 to find that the carrying properties and the winding properties were good as shown in Table 1.

Example 4

The unstretched film obtained in Example 1 alone was previously stretched so as to give a thickness of 1.7 $\mu$m by the stretching means employed in Example 1.

The above film and a substrate made from a mixture of natural fibers and synthetic fibers and having a basis weight of 10.5 g/m$^2$ were laminated using an adhesive to make a stencil sheet.

The stencil sheet had a tensile strength in lengthwise direction of 0.67 kgf/cm, a KES bending rigidity value B of length/width=0.028/0.020 gf·cm$^2$/cm, and a residual torque of 0.2197 g·cm/cm.

The stencil sheet was evaluated in the same manner as in Example 1 to find that the carrying properties and the winding properties were good as shown in Table 1.

Example 5

A heat-sensitive stencil sheet was made in the same manner as in Example 1, except that a nonwoven fabric of 120 g/m$^2$ in basis weight and 7.6 $\mu$m in average fiber diameter was used as the nonwoven fabric laminated with the unstretched film.

The resulting stencil sheet had a basis weight of 11 g/m$^2$, and the average fiber diameter of the substrate was 3.8 $\mu$m, and the thickness of the film was 1.5 $\mu$m.

The stencil sheet had a tensile strength in lengthwise direction of 0.41 kgf/cm, a KES bending rigidity value B of length/width=0.056/0.042 gf·cm$^2$/cm, and a residual torque of 0.1513 g·cm/cm.

The stencil sheet was evaluated in the same manner as in Example 1 to find that the carrying properties and the winding properties were good as shown in Table 1. Creases were formed on the drum, but this was practically acceptable.

Comparative Example 1

A heat-sensitive stencil sheet was made in the same manner as in Example 1, except that a nonwoven fabric of 105 g/m$^2$ in basis weight and 7.6 $\mu$m in average fiber diameter was used as the nonwoven fabric laminated with the unstretched film.

The resulting stencil sheet had a basis weight of 9.5 g/m$^2$, and the average fiber diameter of the substrate was 3.8 $\mu$m, and the thickness of the film was 1.5 $\mu$m.

The stencil sheet had a tensile strength in lengthwise direction of 0.38 kgf/cm, a KES bending rigidity value B of length/width=0.028/0.028 gf·cm$^2$/cm, and a residual torque of 0.1080 g·cm/cm.

The stencil sheet was evaluated in the same manner as in Example 1 to find that jamming of the sheet during carrying did not occur and the carrying properties were good, but creases were produced when the sheet is wound around the drum as shown in Table 1, and the crease portions caused uneven transfer of ink in printing and the quality of the prints was deteriorated.

TABLE 1

| | Basis weight of fibers | Average fiber diameter | Film thickness | Lengthwise tensile strength (at 2% elongation) | KES bending rigidity value B (average bending rigidity) (gf · cm$^2$/cm) | |
|---|---|---|---|---|---|---|
| | (g/m$^2$) | ($\mu$m) | ($\mu$m) | (kgf/cm) | MD (lengthwise) | CD (crosswise) |
| Example 1 | 12.8 | 8.7 | 1.5 | 0.39 | 0.068 | 0.055 |
| Example 2 | 12.0 | 7.0 | 1.5 | 0.38 | 0.059 | 0.049 |
| Example 3 | 10.0 | 7.0 | 1.5 | 0.31 | 0.041 | 0.035 |
| Example 4 | 10.5 | — | 1.7 | 0.67 | 0.028 | 0.020 |
| Example 5 | 11.0 | 3.8 | 1.5 | 0.41 | 0.056 | 0.042 |
| Comparative Example 1 | 9.5 | 3.8 | 1.5 | 0.38 | 0.028 | 0.028 |

| | Recovery from KES bending | | | | |
|---|---|---|---|---|---|
| | Bending torque (T) (g · cm/cm) MD (lengthwise) | Bending hysteresis (H) (g · cm/cm) MD (lengthwise) | Residual torque (T-H) (g · cm/cm) MD (lengthwise) | Jamming upon carrying | Creasing on drum |
| Example 1 | 0.2620 | 0.0044 | 0.2576 | ○ | ○ |
| Example 2 | 0.2546 | 0.0034 | 0.2512 | ○ | ○ |
| Example 3 | 0.1896 | 0.0021 | 0.1875 | ○ | ○ |
| Example 4 | 0.2200 | 0.0003 | 0.2197 | ○ | ○ |
| Example 5 | 0.1561 | 0.0048 | 0.1513 | ○ | Δ |
| Comparative Example 1 | 0.1094 | 0.0014 | 0.1080 | ○ | X |

Criteria of evaluation
○: Neither jamming at carrying nor creasing on drum occurred.
Δ: Jamming at carrying or creasing on drum occurred, but the sheet was practically acceptable.
X: Jamming at carrying or creasing on drum occurred, and the sheet was not usable.

As can be seen from Table 1, when the residual torque of stencil sheets in lengthwise direction is 0.150 g·cm/cm or more, preferably 0.180 g·cm/cm or more, both the carrying properties and the winding properties are satisfactory.

The heat-sensitive stencil sheet of the present invention is specified in its residual torque. Therefore, even if bubbles are retained between the stencil sheet and the printing drum at the time of winding it around the printing drum and cause bending and raising of the sheet, the sheet has a recovery power from the bending state, and thus the sheet is not buckled, inhibiting generation of creases on the printing drum to provide good printed images. In addition, the sheet is superior in carrying properties and failure of carrying is also inhibited.

We claim:

1. A heat-sensitive stencil sheet, which comprises a laminate of a thermoplastic resin film and a fiber-containing porous substrate, said stencil sheet satisfying $0.150 \leqq T-H$ wherein T means an arithmetic average value (g·cm/cm) of absolute values of KES bending torque in lengthwise direction of the stencil sheet at curvatures of +2.3 and −2.3 ($cm^{-1}$), H means a bending hysteresis (g·cm/cm), and T−H means a residual torque (g·cm/cm).

2. A heat-sensitive stencil sheet according to claim 1, wherein said heat-sensitive stencil sheets has a KES bending rigidity value B per unit length of 0.02 gf $cm^2$/cm or more.

3. A heat-sensitive stencil sheet according to claim 2, wherein said value B is in a cross-wise direction with respect to said heat-sensitive stencil sheet.

4. A heat-sensitive stencil sheet according to claim 2, wherein said value B is in the length wise direction of said heat-sensitive stencil sheet.

5. A heat-sensitive stencil sheet according to claim 1, wherein the tensile strength in the lengthwise direction is 0.3 kgf/cm or more.

6. A heat-sensitive stencil sheet according to claim 2, wherein the tensile strength in the lengthwise direction is 0.3 kgf/cm or more.

7. A heat-sensitive stencil sheet according to claim 1, wherein said porous substrate comprises synthetic fibers.

8. A heat-sensitive stencil sheet according to claim 1, wherein said porous substrate is mainly composed of synthetic fibers.

9. A heat-sensitive stencil sheet according to claim 1, wherein a release agent is provided on a surface of said thermoplastic film which is not laminated to said substrate.

10. A stencil printing method having reduced incidence of stencil sheets jamming in a stencil printing apparatus that includes a printing drum, and essentially avoiding creasing a heat-sensitive stencil sheet on said printing drum during stencil printing, said method comprising providing a heat-sensitive stencil sheet comprising a laminate of a thermoplastic resin film and a fiber-containing porous substrate, wherein the provided heat-sensitive stencil sheet is selected so as to satisfy $0.150 \leqq T-H$ wherein T means an arithmetic average value (g·cm/cm) of absolute values of KES bending torque in lengthwise direction of the stencil sheet at curvatures of +2.3 and −2.3 ($cm^{-1}$), H means a bending hysteresis (g·cm/cm), and T−H means a residual torque (g·cm/cm);

feeding said heat-sensitive stencil sheet to said stencil printing apparatus; and conducting stencil printing using said apparatus, wherein during stencil printing creasing said heat-sensitive stencil sheet when winding or holding same on said printing drum is at least essentially avoided.

* * * * *